United States Patent
Filipeti et al.

(10) Patent No.: US 10,707,733 B2
(45) Date of Patent: Jul. 7, 2020

(54) SYNCHRONOUS RELUCTANCE MOTOR ASSISTED BY PERMANENT MAGNETS

(71) Applicant: Enerdrive Limited, Wan Chai (HK)

(72) Inventors: Davor Filipeti, Rasa (HR); Boris Karuzic, Rasa (HR)

(73) Assignee: Enerdrive Limited, Wan Chai (HK)

( * ) Notice: Subject to any disclaimer, the term of this patent is extended or adjusted under 35 U.S.C. 154(b) by 24 days.

(21) Appl. No.: 15/574,623

(22) PCT Filed: May 23, 2016

(86) PCT No.: PCT/IB2016/053002
§ 371 (c)(1),
(2) Date: Nov. 16, 2017

(87) PCT Pub. No.: WO2016/189445
PCT Pub. Date: Dec. 1, 2016

(65) Prior Publication Data
US 2018/0138765 A1    May 17, 2018

(30) Foreign Application Priority Data
May 22, 2015    (IT) .................. 102015000017072

(51) Int. Cl.
*H02K 1/24* (2006.01)
*H02K 1/27* (2006.01)
(Continued)

(52) U.S. Cl.
CPC .......... *H02K 19/103* (2013.01); *H02K 1/246* (2013.01); *H02K 1/2726* (2013.01);
(Continued)

(58) Field of Classification Search
CPC .................. H02K 21/14; H02K 21/16
(Continued)

(56) References Cited

U.S. PATENT DOCUMENTS

| | | | |
|---|---|---|---|
| 5,818,140 A * | 10/1998 | Vagati ................ | H02K 1/246 310/185 |
| 6,630,762 B2 * | 10/2003 | Naito .................. | H02K 1/2766 310/156.53 |

(Continued)

FOREIGN PATENT DOCUMENTS

| | | |
|---|---|---|
| CN | 102780292 | 11/2012 |
| DE | 19933009 | 2/2000 |
| EP | 1164683 | 12/2001 |

OTHER PUBLICATIONS

International Search Report for PCT/IB2016/053002 dated Jul. 20, 2016 (three pages).

*Primary Examiner* — John K Kim
(74) *Attorney, Agent, or Firm* — Tutunjian & Bitetto, P.C.

(57) ABSTRACT

A synchronous reluctance motor assisted by permanent magnets comprises a stator provided with stator windings, for generating a magnetic flux, which has a circular central seat to house a cylindrical shaped rotor suitable for being actuated in rotation about an axis of rotation, wherein the rotor comprises internal slots, for housing respective permanent magnets, and wherein the internal slots and the permanent magnets are curvilinear shaped in order to optimise the magnetic interaction between the rotor and the stator windings.

5 Claims, 2 Drawing Sheets

(51) Int. Cl.
  *H02K 3/12*    (2006.01)
  *H02K 19/10*   (2006.01)
  *H02K 21/14*   (2006.01)
  *H02K 21/16*   (2006.01)

(52) U.S. Cl.
  CPC ........... *H02K 1/2766* (2013.01); *H02K 21/14* (2013.01); *H02K 3/12* (2013.01); *H02K 21/16* (2013.01); *H02K 2201/06* (2013.01)

(58) Field of Classification Search
  USPC .......................... 310/156.38, 156.53, 156.56
  See application file for complete search history.

(56) References Cited

U.S. PATENT DOCUMENTS

| | | | |
|---|---|---|---|
| 6,836,045 B2* | 12/2004 | Murakami | H02K 1/246 |
| | | | 310/156.53 |
| 9,515,526 B2* | 12/2016 | Huang | H02K 1/2766 |
| 10,033,234 B2* | 7/2018 | Sasaki | H02K 21/12 |
| 10,348,173 B2* | 7/2019 | Tong | H02K 19/02 |
| 2002/0070620 A1* | 6/2002 | Naito | H02K 1/2766 |
| | | | 310/156.56 |
| 2007/0063607 A1* | 3/2007 | Hattori | H02K 1/2766 |
| | | | 310/156.53 |
| 2007/0205688 A1 | 9/2007 | Murakami et al. | |
| 2016/0380492 A1* | 12/2016 | Kawasaki | H02K 1/2766 |
| | | | 310/156.11 |
| 2018/0138765 A1* | 5/2018 | Filipeti | H02K 3/12 |

* cited by examiner

SYNCHRONOUS RELUCTANCE MOTOR ASSISTED BY PERMANENT MAGNETS

TECHNICAL FIELD OF THE INVENTION

The present invention refers to a synchronous reluctance motor, assisted by permanent magnets, wherein the permanent magnets are positioned inside the rotor.

STATE OF THE ART

As known, synchronous reluctance motors assisted by permanent magnets comprise a stator element, provided with electrical windings defining pairs of poles, inside which a mobile element—rotor—is arranged that is adapted to be set in rotation about an axis of rotation.

The rotor is separated from the stator by a space defined as air gap.

The rotor is substantially cylinder-shaped.

In so-called SPM (Surface Permanent Magnet) motors the permanent magnets are arranged on the outer surface of the rotor whereas in so-called IPM (Interior Permanent Magnet) motors, the permanent magnets are housed in seats provided inside the rotor.

Depending on the configuration of the rotor and the positioning of the permanent magnets in the latter, isotropic or anisotropic structures are obtained from the magnetic point of view.

With reference to a synchronous reluctance motor of the IPM type, the rotor has an anisotropic magnetic structure in which portions of minimum reluctance are foreseen that act as guides for the magnetic flux during the operation of the motor itself.

Depending on the power required to the synchronous reluctance motor and the modes of use foreseen, the number of poles or the quantity and/or type of materials used for the permanent magnets, etc., can change.

Based on the type of material used to make the permanent magnets, for the same efficiency, the size of the synchronous reluctance motor can change, as well as the production costs thereof.

As known, the group of materials normally used to make permanent magnets includes ferrite, also known as alpha-ferrite (a-Fe) or so-called "rare earths" Neodymium-Iron-Boron (NdFeB) that have better performance in terms of magnetic field or power with respect to ferrite.

Despite the better performance, a limit to the use of rare earths for making permanent magnets is the high supply cost of the base material that, on average, is greater than that of ferrite by more than one order of magnitude.

Moreover, the disposal of rare earth permanent magnets is more complex and expensive than that of ferrite magnets.

With respect to other solutions such as conventional alternating current motors, synchronous reluctance motors assisted by permanent magnets ensure substantially similar performance with an overall reduction in weight and bulk of the motor itself.

Although the current manufacturing costs of synchronous reluctance motors are greater than those of the conventional solutions, the advantages achieved by them are promoting their use, in particular, in the fields in which the weight and bulk of the motor, as well as the possibility to precisely adjust the operating speed thereof, are of particular relevance.

There is the need to improve the performance of synchronous reluctance motors assisted by permanent magnets, even still ensuring low weights and bulks of such motors with respect to conventional solutions.

SUMMARY OF THE INVENTION

The task of the present invention is to improve the state of the art.

In such a technical task an object of the present invention is to provide a synchronous reluctance motor assisted by permanent magnets with high performance.

A further object of the present invention is to provide a synchronous reluctance motor assisted by permanent magnets that ensures correct operation even at high rotation speeds without undergoing damage.

Another object of the present invention is to provide a synchronous reluctance motor assisted by permanent magnets in which the magnetic interaction between the rotor and the stator is optimised with respect to conventional solutions.

Another object of the present invention is to provide a synchronous reluctance motor assisted by permanent magnets that, having the same dimensions, is capable of ensuring better performance with respect to conventional synchronous reluctance motors.

In accordance with an aspect of the present invention a synchronous reluctance motor assisted by permanent magnets is foreseen according to the present application.

The present application refers to preferred and advantageous embodiments of the invention.

BRIEF DESCRIPTION OF THE DRAWINGS

Further characteristics and advantages of the present invention will become clearer from the detailed description of a preferred, but not exclusive, embodiment of a synchronous reluctance motor assisted by permanent magnets, illustrated as a non-limiting example in the attached tables of drawings, in which.

DETAILED DESCRIPTION OF THE INVENTION

With reference to the attached figures, a synchronous reluctance motor of the type assisted by permanent magnets is overall indicated with 1.

More precisely, it should be observed that the synchronous reluctance motor 1 according to the present invention is of the so-called IPM (Interior Permanent Magnet) type, in which the permanent magnets are positioned inside the rotor itself, according to ways described hereinafter.

For the sake of clarity of description hereinafter the term "synchronous reluctance motor" is intended to indicate a synchronous reluctance motor of the type assisted by internal permanent magnets.

The synchronous reluctance motor 1 according to the present invention comprises a stator 2 inside which a rotor 3 is arranged.

In detail, the rotor 3 is housed inside a circular central seat 4 provided in the stator 2.

Between the rotor 3 and the stator 2 there is a small separation space known as "air gap".

The stator 2 can have a substantially annular configuration, whereas the rotor 3 has a substantially cylindrical configuration.

Figure 2:
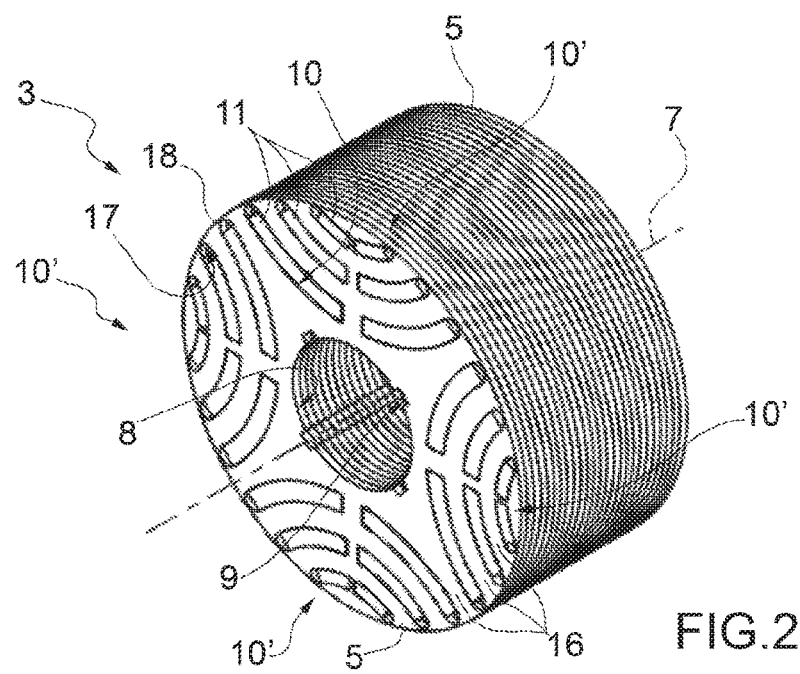
FIG. 2 is a schematic perspective view of the rotor of a synchronous reluctance motor according to the present invention.

According to an aspect of the present invention, the rotor 3 can be obtained through the aligned stacking in succession of a plurality of metallic plates 5, shaped like discs, constrained to one another to constitute a cylindrical element (FIG. 2).

The internal configuration of the rotor 3 will be described in greater detail hereinafter.

The stator 2, at the inner peripheral portion that in uses faces onto the rotor 3, has a plurality of windings, wholly indicated with 6, called as stator windings. In use, the stator windings 6 are fed in a controlled manner in order to generate a magnetic field that is variable in intensity and direction to determine the rotation of the rotor 3 about an axis of rotation 7 (FIG. 2).

The operating principle of a synchronous reluctance motor 1 is considered to be known and, therefore, the description of the characteristics of such an electric motor will be limited to the aspects necessary to understand the present invention.

As stated, according to a version of the present invention, the rotor 3 is made up of a plurality of disc-shaped metallic plates 5 aligned in succession after one another.

The internal configuration of the rotor 3 is defined to optimise the performance of a synchronous reluctance motor 1 according to the present invention, with particular reference to the channeling and interaction with the magnetic field generated in the stator 2 along the rotor 3 itself.

The rotor 3 internally has a central seat 8 configured in use for the connection of the rotor 3 itself with a transmission shaft, not illustrated in the attached figures, to be actuated in rotation.

Concerning this, according to a version of the present invention, at the central seat 8 there can be reference slots 9 for abutment, in use, with keys or similar locking elements arranged along the transmission shaft.

It should be observed that along the transmission shaft it is possible to arrange groups of plates 5, in which the single groups are angularly offset from one another to constitute an anisotropic rotor 3 along the aforementioned transmission shaft.

The rotor 3 has a plurality of internal slots 10 that act as seats for housing respective permanent magnets 11.

According to an aspect of the present invention, the internal slots 10 are curvilinear shaped, like an arc of circumference.

Figures 4, 5:
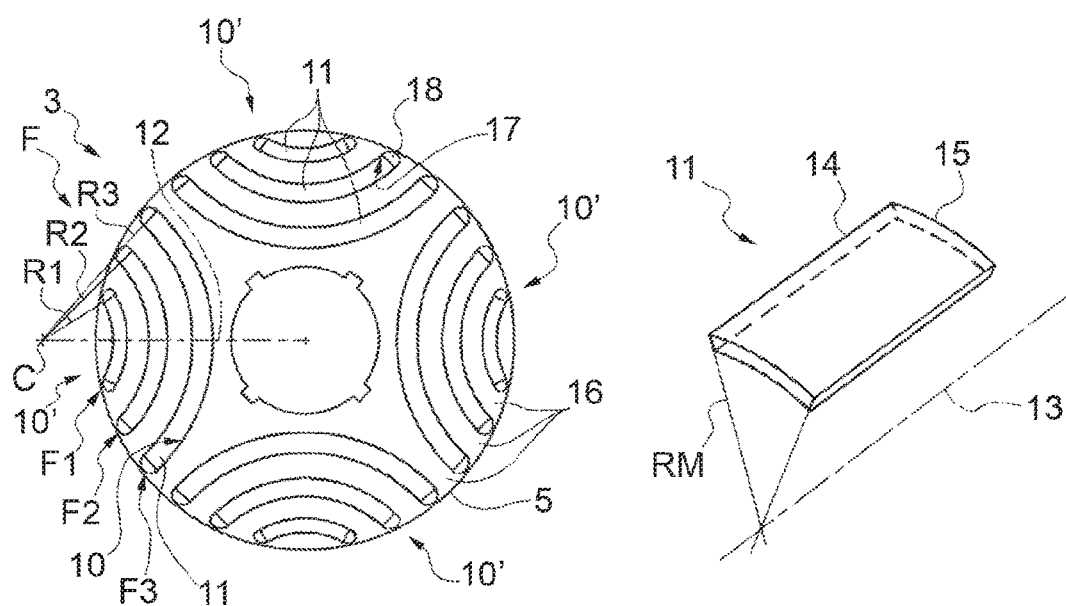
FIG. 4 is a section view of a further version of the rotor of a synchronous reluctance motor according to the present invention.
FIG. 5 is a schematic perspective view of a component of the synchronous reluctance motor according to the present invention.

Similarly, each permanent magnet 11 is shaped so as to substantially match the shape of the respective internal slot 10 in which, in use, it is foreseen for it to be housed (FIG. 5).

The specific function of the configuration of the internal slots 10 and of the permanent magnets 11 in the synchronous reluctance motor 1 according to the present invention will become clearer hereinafter.

According to an aspect of the present invention, the rotor 3 comprises groups 10' of internal slots 10.

Each group 10' has the same characteristics as the other groups 10' foreseen in the rotor 3, with reference to the number, the size and the arrangement of the internal slots 10 comprised in them, as will be described more clearly hereinafter.

The total number of such groups 10' is substantially equal to the number of poles of the synchronous reluctance motor 1.

The groups 10' are arranged equidistant from one another in the angular direction along the rotor 3.

Hereinafter, for the description of the structural features of the rotor 3 reference will be made to the embodiment illustrated in the attached figures, relative to a synchronous reluctance motor having four poles.

According to such a version, the rotor 3 has four groups 10' of internal slots 10, arranged equidistant from one another in the angular direction, mutually offset by 90°.

It should be understood that for synchronous reluctance motors 1 with a different number of poles, analogous considerations to those given above are valid.

Each group 10' comprises at least one internal slot 10, as stated, having a curvilinear shape.

Figure 1:
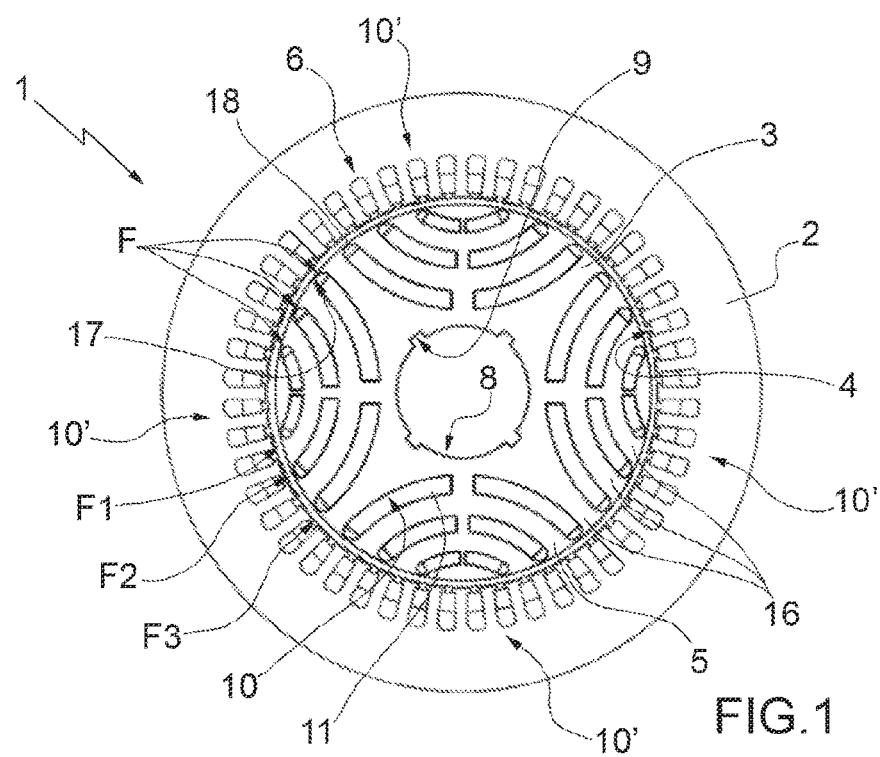
FIG. 1 is a schematic cross section view of a synchronous reluctance motor assisted by permanent magnets, wherein the main components of the motor itself are illustrated.

According to a version of the present invention, each group 10' comprises at least two rows F of internal slots 10, arranged in succession after one another along the radial direction of the rotor 3 (FIG. 1).

According to a version of the present invention, each group 10' comprises three rows F1, F2, F3 of internal slots 10.

Each row F, F1, F2, F3, in turn, can comprise at least one internal slot 10.

However, further configurations of the synchronous reluctance motor 1 are possible, comprising a greater or smaller number of rows F with respect to what is described above, without for this reason departing from the scope of protection of the present invention.

Moreover, further embodiments are possible in which at least one of the rows F comprises two or more internal slots 10, arranged aligned with each other along the row F itself, as described more clearly hereinafter.

It should be observed that the dimensions of the internal slots 10 belonging to one same group 10' can vary as a function of the position in which they are made inside the rotor 3.

The internal slots 10 present inside the rotor 3 are shaped and positioned so as to determine a symmetrical internal structure for the rotor 3 and thus promote the balancing thereof during its rotation, in use, about the axis of rotation 7.

Such balancing is necessary to reduce the triggering and the transmission of undesired vibrations during the rotation of the rotor 3 that could cause the synchronous reluctance motor 1 to be damaged.

Hereinafter, the term "total extension" is meant to indicate the total extension of a row F in the circumferential direction.

In the case in which a row F comprises a single internal slot 10 (FIG. 4), the total extension of such a row F substantially corresponds to that of the internal slot 10 itself.

In the case in which a row F comprises two or more internal slots 10 (FIGS. 1-3), possibly separated and spaced apart in the circumferential direction, the total extension of such a row F corresponds to the sum of the single internal slots 10 of which it consists and of the dividing walls arranged between them.

As far as the total extension of each of the rows F is concerned, taken as length (extension) and/or width thereof, it should be observed that the two F of internal slots 10 arranged at the inner portion of the rotor 3, proximal to the axis of rotation 7, have a greater total extension with respect to that of the rows F of internal slots 10 foreseen near to the outer cylindrical surface of the rotor 3 itself. In practice, the total size of each row F of internal slots 10 decreases moving from the centre of the rotor 3 towards the outer cylindrical surface thereof.

The single rows F along which the internal slots 10 extend are curvilinear shaped and have a respective radius of curvature R.

Similarly, the internal slots 10 are made like curvilinear slots.

According to an aspect of the present invention, the radius of curvature R of each row F of internal slots 10 is constant.

Figure 3:
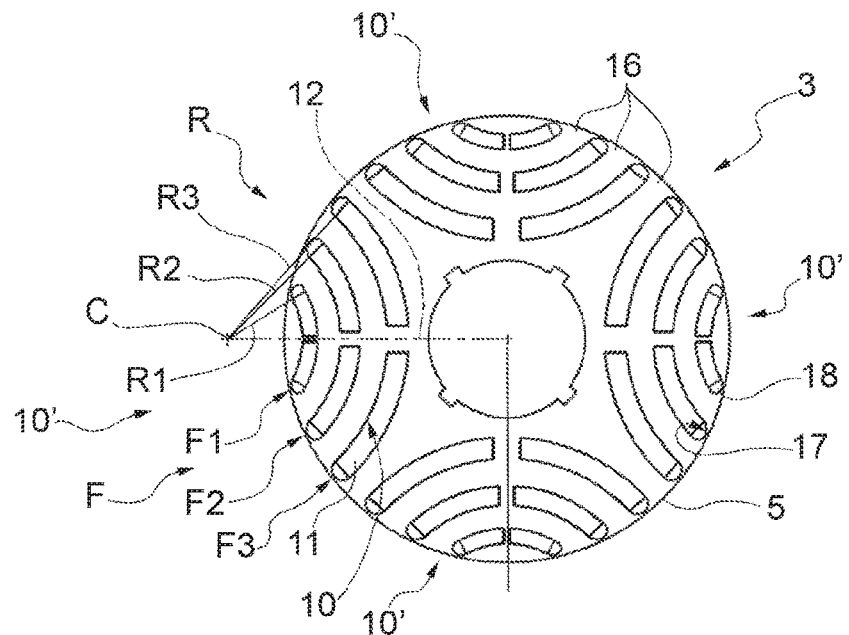
FIG. 3 is a section view of a version of the rotor of a synchronous reluctance motor according to FIG. 2.

The single rows F1, F2, F3 of internal slots 10 have a respective radius of curvature R1, R2, R3 (FIG. 3).

The radiuses of curvature R1, R2, R3 can have substantially the same centre of curvature C.

According to a version of the present invention, the first row F1 has a respective first radius of curvature R1; similarly, the second row F2 has a second radius of curvature R2 and the third row F3 has a third radius of curvature R3.

According to such a version, as a non-limiting example, the first radius of curvature R1 is smaller than the remaining radiuses of curvature R2 and R3 and the second radius of curvature R2 is smaller than the third radius of curvature R3.

According to a further version of the present invention, at least one of the radiuses of curvature R1, R2, R3 can have its own centre of curvature that does not coincide with the centre of curvature C of the other radiuses of curvature R.

As stated, the rows F of internal slots 10 belonging to the same group 10' are aligned with each other along a radial direction of the rotor 3.

In greater detail, each group 10' can have a respective central axis of symmetry 12.

According to a version of the present invention, the axis of symmetry 12 is aligned with a radius of the rotor 3.

According to a further version of the present invention, the axis of symmetry 12 can coincide with a radius of the rotor 3.

According to a version of the present invention, each row F, F1, F2, F3 can have a pair of internal slots 10 that extend symmetrically from such an axis of symmetry 12 (FIG. 3).

According to a further version of the present invention, at least one group 10' can have a row F comprising a single internal slot 10 (FIG. 4) that extends symmetrically relative to the axis of symmetry 12 of such a group 10'.

According to a further version of the present invention, not illustrated in the attached figures, a group 10' can have at least one first row F comprising a single internal slot 10 and at least one second row F comprising at least two internal slots 10.

As stated, in the synchronous reluctance motor 1 the permanent magnets 11 are shaped substantially to match a respective internal slot 10 inside which, in use, they are introduced and associated.

Each permanent magnet 11 corresponds to an elongated element along a respective longitudinal axis 13 (FIG. 5).

Each permanent magnet 11 has a first side 14 and a second side 15 that are perpendicular to each other.

According to a version of the present invention, the first side 14 has a greater length with respect to the second side 15.

Each permanent magnet 11 has a reduced thickness with respect to the dimensions of the first side 14 and of the second side 15.

According to such a version, the second side 15 is curved, and corresponds to an arc of circumference with constant radius of curvature RM.

In practice, with reference to the embodiment illustrated in FIG. 5, each permanent magnet 11 can be configured like a curved elongated element along a direction that geometrically corresponds to a sector of a hollow cylindrical element comprised between two mutually parallel planes, and perpendicular to the central axis of symmetry of the cylindrical element, and two planes intersecting such a central axis of symmetry of the cylindrical element, not illustrated in the attached figures.

As an example, each permanent magnet 11 has a shape that follows the concave shape of a tile.

Inside the rotor 3, the single internal slots 10 are separated from one another by conveying portions 16 of the magnetic flux.

Such conveying portions 16, moreover, separate the single groups 10' of internal slots 10 from one another.

The conveying portions 16 define preferential paths, called "channels", along which the magnetic flux generated in the stator 2 is channeled. The conveying portions 16 also constitute structural elements for the rotor 3 itself, ensuring the dimensional stability thereof during the rotation, in use, about the axis of rotation 7.

Moreover, the conveying portions 16 act as holding elements for the permanent magnets 11 arranged inside the respective internal slots 10.

Similarly to what has been described earlier relative to the internal slots 10, the permanent magnets 11 are arranged symmetrically inside the rotor 3, in order to ensure a mechanical and magnetic balancing thereof.

As stated, the internal slots 10 and the permanent magnets 11 are made curved, with an arc of circumference shaped profile.

Such a configuration makes it possible to maximise the magnetic interaction between the rotor 3 and the stator 2.

The permanent magnets 11, indeed, being curvilinear shaped, allow a substantially uniform magnetic interaction to be obtained between the rotor 3 and the magnetic field generated in the stator 2.

This is not possible in conventional solutions, in which the permanent magnets are configured substantially like elongated prisms.

Such a configuration of the permanent magnets, indeed, does not make it possible to obtain a uniform interaction with the magnetic flux generated in the stator 2.

In fact, in conventional solutions, not illustrated in the figures, the permanent magnets have a rectilinear cross section and, therefore, at the end portions they do not ensure an optimal interaction with the magnetic flux of the stator 2 equal to that of their central portion.

In the permanent magnets 11 according to the present invention, on the other hand, the interaction with the magnetic flux of the stator 2 is substantially uniform along the entire extension of the permanent magnet 11, which in use substantially corresponds to the extension along a respective row F (FIG. 1). If in the rotor 3 according to the present invention, the internal slots 10 are filled with prismatic permanent magnets, not curved, it would still not be possible to obtain the efficiency of the synchronous reluctance motor 1.

Concerning this, it should be observed that by placing many prismatic magnets side-by-side inside the single internal slots 10, which are curved, it would not be possible to ensure a uniform interaction between such prismatic magnets and the magnetic field generated in the stator 2 due both to the discontinuities between one prismatic magnet and the next inside one same internal slot 10, and for the reasons described above relative to the configuration of a prismatic magnet.

In fact, in the synchronous reluctance motor 1 according to the present invention, having the same size of the single internal slots 10, it is possible to use a greater amount of permanent magnet 11 with respect to conventional solutions.

Moreover, in the synchronous reluctance motor 1, the curvilinear configuration of the permanent magnets 11 inside the rotor 3 allows higher performance to be obtained with respect to conventional synchronous reluctance motors, since the magnetic non-homogeneity inside the single internal slots, in which the respective permanent magnets 11 are arranged, is avoided and the flux losses at the end portions of the permanent magnets 11 themselves are minimised.

In practice, the permanent magnets 11 thus configured allow a substantially uniform magnetic interaction with the field generated in the stator 2 for their entire length, meaning extension along a respective row F.

In order to optimise the magnetic interaction between the rotor 3 and the stator 2, the concavity of the curvature of the internal slots 10 is discordant with the outer circumference of the rotor 3.

According to a version of the present invention, each internal slot 10, at least at a distal end 17 thereof from the respective axis of symmetry 12, can have at least one portion 18 without permanent magnet 11.

As a non-limiting example, the end 17 can be rounded, to make it easier to production.

In use, with the permanent magnet 11 introduced in a respective internal slot 10, the portion 18 can act as a housing for a filling material, for example a glue, adapted for firmly constraining the permanent magnet 11 itself inside the internal slot 10 and avoiding the displacement thereof during the rotation of the rotor 3 itself.

According to a version of the present invention the filling material is a resin of the setting type.

However, further types of glues suitable for the purpose are possible.

Moreover, in the case in which the rotor 3 consists of a stack of plates 5 stacked on top of one another, the glue inside the slots 18 can act as a further joining element between the single plates 5, thus promoting a high cohesion and resistance of the rotor 3 itself to mechanical stresses.

The synchronous reluctance motor 1 according to the above allows the magnetic interaction between the rotor 3 and the stator 2 to be optimised, allowing better performance to be obtained, for the same size of the rotor 3 itself, with respect to that of conventional synchronous reluctance motors with permanent magnets that foresee the use of prismatic permanent magnets.

Moreover, the synchronous reluctance motor 1 according to the present invention can reach higher rotation speeds than those of conventional solutions, due to a better magnetic interaction between the rotor 3 and the stator 2.

As a non-limiting example, the synchronous reluctance motor 1 can even reach speeds of about 17000 revs per minute, without suffering damage.

The invention thus conceived can undergo numerous modifications and variants all of which are covered by the inventive concept.

Moreover, all of the details can be replaced by other technically equivalent elements. In practice, the materials used, as well as the contingent shapes and sizes, can be whatever according to requirements, without for this reason departing from the scope of protection of the following claims.

The invention claimed is:

1. A synchronous reluctance motor assisted by permanent magnets comprising:
   a stator provided with stator windings for generating a magnetic flux, said stator having a central seat; and
   a cylindrical rotor housed in said central seat and adapted for rotation about a rotation axis, said rotor comprising internal slots for housing respective permanent magnets;
   wherein each one of said internal slots has a respective axis of symmetry extending in a radial direction with respect to said rotor, each one of said internal slots extending symmetrically from said respective axis of symmetry,
   wherein said rotor consists of a stack of plates stacked on top of one another, each one of said internal slot having at least one distal end from the respective axis of symmetry with at least one portion without permanent magnet,
   wherein said internal slots and said permanent magnets are curvilinearly shaped to optimize the magnetic interaction between said permanent magnets and said stator windings;
   wherein said internal slots are arranged in groups, the number of groups corresponding to the number of poles of said synchronous reluctance motor;
   wherein said groups are arranged to be equidistant from each other in an angular direction along said rotor, each of said groups comprising one row of said internal slots;
   wherein each row of internal slots is curvedly shaped according to a respective constant radius of curvature (R, R1, R2, R3) at any point of each row and has a center of curvature through which each of said radiuses of curvature passes;
   wherein at least one of said radiuses of curvature (R, R1, R2, R3) has its own center of curvature that does not coincide with the center of curvature of the other radiuses;
   wherein said synchronous reluctance motor comprises a material for fixing one of said permanent magnets within a respective one of said internal slots, said fixing material being positioned at least one distal end from said axis of symmetry, in an interposed position between said internal slot and one of said permanent magnets;
   wherein said fixing material is a resin of a setting type or a glue filling said at least one portion without permanent magnet to firmly constrain said permanent magnet inside said internal slot and avoid the displacement thereof during the rotation of the rotor,
   wherein the resin or glue in said at least one portion is introduced between the single plates of said stack of plates to act as a further joining element therebetween and promote a high cohesion and resistance of the rotor to mechanical stresses.

2. The synchronous reluctance motor according to claim 1, wherein said permanent magnets are substantially complementarily shaped with respect to said internal slots, wherein they are housed, in use, through shape coupling.

3. The synchronous reluctance motor according to claim 1, wherein each one of said permanent magnets is shaped as an elongated element extending along a respective longitudinal axis, each of said permanent magnets having a first side and a second side perpendicular to each other.

4. The synchronous reluctance motor according to claim 1, wherein the number of said permanent magnets is equal to the number of said internal slots.

5. The synchronous reluctance motor according to claim 1, wherein said internal slots have a rounded end.

* * * * *